United States Patent
Fink et al.

(10) Patent No.: US 9,517,829 B2
(45) Date of Patent: Dec. 13, 2016

(54) AIRCRAFT FUSELAGE STRUCTURE

(71) Applicant: Airbus Operations GmbH, Hamburg (DE)

(72) Inventors: Kai Fink, Hamburg (DE); Alexei Vichniakov, Hamburg (DE); Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 190 days.

(21) Appl. No.: 14/449,543

(22) Filed: Aug. 1, 2014

(65) Prior Publication Data

US 2015/0034764 A1 Feb. 5, 2015

(30) Foreign Application Priority Data

Aug. 2, 2013 (DE) .......................... 10 2013 215 228

(51) Int. Cl.
*B64C 1/18* (2006.01)
*B64C 1/06* (2006.01)
(Continued)

(52) U.S. Cl.
CPC ................. *B64C 1/061* (2013.01); *B64C 1/18* (2013.01); *F16B 7/0406* (2013.01); *F16B 7/22* (2013.01)

(58) Field of Classification Search
CPC ............... B64C 1/18; B64C 1/061; B64C 1/20
(Continued)

(56) References Cited

U.S. PATENT DOCUMENTS 2,836,444 A * 5/1958 Arnold ................... A47B 91/08
403/18
7,255,059 B1 * 8/2007 McDonald ............. B63B 17/00
114/188
(Continued)

FOREIGN PATENT DOCUMENTS

DE 10 2009 012 428 9/2010
DE 10 2010 035 787 3/2012

OTHER PUBLICATIONS

German Search Report for Application No. 10 2013 215 228.0 dated Sep. 16, 2013.

*Primary Examiner* — Brian M O'Hara
*Assistant Examiner* — Michael Kreiner
(74) *Attorney, Agent, or Firm* — Jenkins, Wilson, Taylor & Hunt, P.A.

(57) ABSTRACT

An aircraft fuselage structure is disclosed having an outer skin, a support structure arrangement with frame elements, and a floor structure arrangement with floor support struts, the floor structure arrangement connected to the support structure arrangement via connection parts. A connection exists between the floor structure arrangement and the support structure arrangement, with a clamping element on the connection part and a locking element on the connection part. The clamping element includes a longitudinal section having a first and a second end. The first end is pivotally attached to the connection part. The second end includes a transverse section, the locking element including at least one locking groove, and the clamping element pivotable between an engagement position in which the transverse section engages the locking groove, and a released position, in which the transverse section is disengaged therefrom.

16 Claims, 4 Drawing Sheets

(51) Int. Cl.
*F16B 7/04* (2006.01)
*F16B 7/22* (2006.01)

(58) Field of Classification Search
USPC .......................................... 403/49, 182, 180
See application file for complete search history.

(56) References Cited

U.S. PATENT DOCUMENTS

| | | |
|---|---|---|
| 8,286,918 B2 | 10/2012 | Huber et al. |
| 8,403,261 B2* | 3/2013 | Delahaye .............. B64F 5/0009 244/118.5 |
| 2011/0001006 A1* | 1/2011 | Delahaye .............. B64F 5/0009 244/118.5 |
| 2013/0306794 A1 | 11/2013 | Zahlen et al. |
| 2014/0291447 A1* | 10/2014 | Goehlich ................ B64C 1/061 244/119 |

* cited by examiner

AIRCRAFT FUSELAGE STRUCTURE

TECHNICAL FIELD

The subject matter disclosed herein relates to an aircraft fuselage structure, comprising an outer skin which encloses an interior space, which has an inner surface facing the interior space, and which extends along an aircraft longitudinal axis, including a support structure arrangement comprising a plurality of frame elements which extend in the circumferential direction along the inner surface of the outer skin, and which are spaced apart from one another in a direction parallel to the aircraft longitudinal axis, and including a floor structure arrangement comprising a floor plate extending in a plane parallel to the aircraft longitudinal axis, a plurality of floor support carriers extending along a bottom surface of the floor plate and perpendicular to the aircraft longitudinal axis, and a plurality of floor support struts, which extend from the floor support carriers at the bottom surface of the floor plate to the frame elements, the floor structure arrangement being connected via connection parts to the support structure arrangement.

BACKGROUND

The outer skin of the fuselage in aircraft is essentially cylindrically shell-shaped, at least in a middle section, wherein the cross-sectional shape may differ, however, from that of a circular cylinder. In this configuration, frame elements extend preferably along the outer skin perpendicular to the aircraft longitudinal axis. In addition to the frame elements, the support structure arrangement for the outer skin may also comprise stringer elements, which also extend along the surface of the outer skin facing the interior space, perpendicular to the frame elements.

A floor structure arrangement may be provided inside the fuselage, preferably in the form of a cabin floor. It may also be a cargo floor, however. The floor plate need not be formed as an integral plate, but may be composed of various components or parts, or a plurality of floor plates may be provided. The floor plate may include one or multiple floor grates or may be designed as such. The floor support struts may be struts of any design for absorbing forces along their direction of extension.

In the prior art, the connections via which the floor structure arrangement is connected to the support structure arrangement are normally designed as rivet connections, in which one section of the floor structure arrangement overlaps another section of the support structure arrangement and in this area of overlap rivets are inserted through both assemblies, which secure both assemblies to one another.

Such rivet connections may be disadvantageous, however. On the one hand, an overlapping of the floor structure arrangement and support structure arrangement involves increased weight, which in aircraft construction must be reduced as a matter of principle. On the other hand, the rivets themselves also add unnecessary weight which, as mentioned above, is a fundamental detriment in aircraft construction. From an ergonomic point of view, the connection of the floor support structure to the aircraft fuselage structure is extremely disadvantageous. In this area in particular, an alternative connection technology, with shorter assembly times and improved access for production workers, would pay dividends.

SUMMARY

Therefore, it is the object of the subject matter disclosed herein to provide an aircraft fuselage structure that includes a connection between the floor structure arrangement and the support structure arrangement, which may be produced as simply and quickly as possible, and without generating dust, does not involve excessive weight or is structurally weakening, and thereby eliminates the aforementioned drawbacks.

This object is achieved in that, of the floor structure arrangement and the support structure arrangement, one includes a clamping element on the connection part, and, of the floor structure arrangement and the support structure arrangement, the other includes a locking element on the connection part, in that the clamping element may engage with the locking element, in that the clamping element includes a longitudinal section having a first and a second end, the first end being attached to the connection part for pivotable movement about a first pivot axis, and the second end including a transverse section which extends—at least a portion thereof, transverse to the longitudinal section—away from the longitudinal section, in that the locking element includes at least one locking groove which is configured to engage with the transverse section, and in that the clamping element may be pivoted between an engagement position, in which the transverse section engages with the locking groove, and a released position, in which the transverse section is disengaged from the locking groove.

In this way, it is possible, within just a few assembly steps, to very simply establish a fixed and durable connection between the support structure arrangement and the floor structure arrangement, merely by joining the connection parts of the support structure arrangement and the floor structure arrangement and subsequently pivoting the clamping element until the transverse section of the clamping element engages with a locking groove of the locking element, wherein no holes are required during the installation process and, thus, no harmful carbon dust is generated. The connection in this case is similar to that of a ski boot buckled to the foot of a wearer. The connection may be very easily made, by an assembler, by hand, or else also with the aid of suitable tools or machines.

In order to stabilize the connection, of the support structure arrangement and the floor structure arrangement, one may include one or more grooves or guides, and of the support structure arrangement and the floor structure arrangement, the other may include one or more projections on the connection part, which engage with the grooves.

The locking element may include multiple, spaced apart and preferably parallel, locking grooves designed to engage with the transverse section in such a way that the clamping element may engage with the locking element to varying degrees, by which, in turn, the strength and rigidity of the connection between the support structure arrangement and the floor structure arrangement may be adjusted. In this arrangement, individual components of the connection parts of the support structure arrangement and floor structure arrangement such as, for example, the clamping element, may be resiliently designed and/or biased.

Applications of the subject matter disclosed herein for other aircraft fuselage-type systems are also conceivable. Such aircraft fuselage-type systems preferably include an elongated fuselage body in which the fuselage body has a floor-like partition. Aircraft fuselage-type systems include, for example, space shuttles in which, depending on the mission, it is advantageous to disassemble the floor plate, in particular the floor grate, in space. This may be the case, for example, for transporting astronauts in the cargo bay to the space station and transporting cargo back to earth (or vice versa), in which the floor plate must be partially disassembled, since otherwise not enough space is available. Aircraft fuselage-type systems may also include, for example, a bus or a railway train, in which the floor grate is partially disassembled, or transport helicopters, in which a modification of the cargo hold dimensions for different-sized cargo is required.

The advantages of the subject matter disclosed herein, described in conjunction with the assembly, are also apparent, however, in connection with a disassembly of the aircraft fuselage structure or floor structure arrangement. A rivet and adhesive connection may generally be detached only with great effort, whereas the connection between floor structure arrangement and support structure arrangement described herein may be detached and reconnected with little effort. The advantages of the subject matter disclosed herein are significant, in particular, for aircraft fuselage-type systems in which accessibility is possible only with great difficulty or the transport of tools is very cumbersome or the use of tools is nearly impossible.

In one preferred embodiment, the longitudinal section includes a first segment and a second segment, the first segment including the first end and the second segment including the second end, the first and the second segments being pivotally connected to one another about a second pivot axis and the second pivot axis extending parallel to the first pivot axis.

Thus, once the transverse section engages with a locking groove, the clamping element, in particular the second segment, may be pre-tensioned by pivoting the first segment about the first pivot axis and relative to the second segment about the second pivot axis, in such a way that the connection parts of the support structure arrangement and floor structure arrangement are pressed against one another and the connection is reinforced and stabilized.

Preferably, the transverse section engages, thereby, with the locking groove, while the first and second segments continue as an extension and preferably parallel to one another, and in order to pretension the clamping element once the transverse section has engaged the locking groove, the first segment is pivoted into a position next to the second segment, preferably parallel to the latter.

It is particularly preferable if an actuation segment is thereby provided on the first segment for manually moving the first segment, the actuation segment being rigidly connected to the first segment and extending away there from. Manual movement within the meaning of the subject matter disclosed herein may also mean that particular auxiliary means such as, for example, special tools that engage with the actuation segment may be used to move the first section. The actuation segment may preferably continue as an extension of the first segment, but may also extend transversely away from the first segment.

With such an actuation segment, it is possible to introduce the force which must be applied to pivot the first segment and, therefore, to preload the clamping element, manually into the first segment and thus to initiate the pivoting of the first segment.

In one preferred embodiment, the ones of the frame elements and the floor support struts include the clamping element, and the others of the frame elements and the floor support struts include the locking element. In this way, the connection according to the subject matter disclosed herein between the frame elements and the floor support struts is established. The frame elements are particularly well suited for absorbing the loads of the floor structure arrangement via the floor support struts, since frame elements and floor support elements normally run in the same plane. With the aid of the connection according to the subject matter disclosed herein, however, it is also conceivable for the floor support struts or other structural elements of the floor structure arrangement to be connected to stringer elements running transversely to the frame elements.

In this arrangement, it is particularly preferable if the frame elements include the clamping element and the floor support struts include the locking element. Such an assembly of clamping element and locking element has proven particularly advantageous, since the locking element may be more easily attached to the floor support struts and takes up less space than the clamping element.

In this arrangement, it is also particularly preferable if the first pivot axis extends perpendicular to the direction of extension of the floor support struts. In this way, the clamping element may be pivoted in the direction of extension of the floor support struts into engagement with the locking element in such a way that, given a force which acts in the direction of extension of the floor support struts, the clamping element or the longitudinal section thereof is oriented parallel to such force and is able to transfer it particularly effectively.

It is also particularly preferable if the locking groove extends parallel to the direction of extension of the floor support struts. With the locking groove configured in such a way, it is possible to particularly effectively transfer a force in the direction of extension of the floor support struts from the locking element to the clamping element.

In one preferred embodiment, the clamping element includes a first and, preferably parallel to the first, a second longitudinal section, the two longitudinal sections being connected by the transverse section. Thus, the clamping element is configured in the shape of a closed frame, which is formed by the two longitudinal sections, the transverse section connecting the longitudinal sections and the articulated attachment of the first end of the longitudinal sections to the connection part about the first pivot axis. With such a frame, it is possible to establish a particularly rigid, durable and secure connection. The two longitudinal sections are designed preferably similar to one another, i.e., symmetrically, for example, but may also differ from one another.

In another preferred embodiment, a first and a second clamping element are provided which, viewed perpendicularly to the direction of extension of the floor support struts, are attached on opposite sides of the connection part, and the locking element, viewed perpendicularly to the direction of extension of the floor support struts, includes locking grooves on opposite sides. When the first clamping element engages with a locking groove on one side of the locking element and the second opposing clamping element, viewed perpendicularly to the direction of extension of the floor support struts, engages with a locking groove on the second side opposite the first side, it is then possible for the connection parts of the support structure arrangement and floor structure arrangement to be connected to one another on opposite sides of the connection parts.

In this way, it is possible first of all, to transmit a significantly greater force in the direction of extension of the floor support struts by using two clamping elements instead of one, and to achieve a significantly greater rigidity of the connection in this direction. Secondly, it is possible to significantly stabilize the connection perpendicular to the direction of extension of the floor support struts and, for example, to prevent a buckling or lateral slipping of the connection parts relative to one another.

In still another preferred embodiment, of the floor structure arrangement and the support structure arrangement, one includes a plug element on the connection part, and of the floor structure arrangement and the support structure arrangement, the other includes a socket element on the connection part, the plug element including a pin which extends in an engagement direction, and the socket element including a hollow space which is shaped in such a way as to receive the pin. Pin and hollow space are preferably cylindrical in design so that the pin may be inserted into the hollow space as easily as possible.

In this way, the plug element may be engaged with the socket element by inserting the pin in the direction of engagement into the hollow space. Using such a pin anchored in the hollow space further stabilizes, laterally, the connection between the floor structure arrangement and the support structure arrangement so that a lateral buckling or slipping of the connection parts relative to one another may be prevented. Moreover, pin and hollow space form a guide as a result, which facilitates the precise placement of the connection parts of floor structure arrangement and support structure arrangement next to one another prior to engagement of the clamping element with the locking element.

In this case, it is particularly preferable if, of the frame elements and the floor support struts, the ones include the plug element, and of the frame elements and floor support struts, the others include the socket element. In this way, the plug-in connection is established between the frame elements and the floor support struts. Similarly, as explained previously with respect to the clamping element and the locking element, the frame elements are particularly well suited for absorbing the loads of the floor structure arrangement via the floor support struts, since frame elements and floor support struts normally run in the same plane. It is also conceivable, however, for floor support struts or other structural elements of the floor structure arrangement to be connected, with the aid of the plug-in connection, to stringer elements running transversely to the frame elements. Preferably, the locking groove and the locking element are disposed on one common connection part, and the socket element and the clamping element are disposed on one common connection part.

Further, it is particularly preferable if the frame elements include the socket element and the floor support struts include the plug element. Similarly, as explained previously with respect to the clamping element and the locking element, such an arrangement of plug element and socket element has proven particularly advantageous, since the floor support struts with the pin may be inserted into the socket element of the frame element, and because the plug element with the pin may be more easily fastened to the floor support struts.

In one preferred embodiment, the clamping element and/or the socket element is fastened to the frame elements with the aid of a clamping device surrounding the frame elements. Such a fastening of the clamping element or the socket element to the frame element is particularly durable and at the same time may be easily assembled or disassembled in order for the socket element and/or clamping element to be removed or replaced.

In this arrangement, it is particularly preferable if the plug element at the end of the floor support strut remote from the floor plate is attached in such a way that the pin is disposed as an extension of the floor support strut. In this way, the longitudinal forces acting on the floor support struts may be transmitted particularly efficiently to the socket element, and the plug connection according to the subject matter disclosed herein is particularly durable. In particular, a buckling of the plug connection may be avoided. Moreover, the assembly, i.e., the introduction of the pin into the hollow space of the socket element, is facilitated with such a pin configuration.

In still another preferred embodiment, the pin has a circumferential outer surface, wherein a plurality of circumferential projections is disposed on the circumferential outer surface, extending away from the surface at an angle relative to the direction of engagement and spaced apart from one another. The hollow space in such case is surrounded by a circumferential inner surface of the socket element, this inner surface being provided with a plurality of circumferential lugs which extend from the inner surface toward the center of the hollow space, and which are adapted to be received between the projections of the pin.

In this way, the connection is further stabilized or strengthened in the direction of engagement, such that both the clamping elements, which engage with the locking elements, as well as the projections of the pin, which engage with the lugs of the hollow space hold the connection part of the floor structure arrangement and the connection part of the support structure arrangement together.

When the pin of the plug element is introduced into the hollow space of the socket element in order to establish a connection between the floor structure arrangement and the support structure arrangement, the projections provided on the outer surface of the pin push the preferably flexible lugs on the inner surface of the socket element, viewed from the center of the hollow space, outward against a pre-tensioning force, such that the lugs, as each projection passes by, are pushed by the pre-tensioning force into the space between the projections.

In this arrangement, the lugs are preferably flexible, such that they may be moved counter to a pre-tensioning force, but may not be moved counter to the direction of engagement. Such characteristics of the lugs may be achieved, for example, by a particular angle of inclination relative to the outer surface of the socket element, by corresponding material characteristics of the lug material or by a corresponding articulated attachment of the lugs to the outer surface of the socket element. In this way, the lugs block a movement of the projections in an opposite direction, such that the pin may no longer be moved out of the hollow space. It is, of course, also conceivable for the projections, instead of the lugs, to be flexibly designed, or for both the projections and the lugs to be flexibly designed.

The pin may be inserted as far as desired into the hollow space, the farther into the hollow space the pin is inserted, the more stable the connection is, i.e., the more projections are pushed past the more lugs. In this way, the position of the floor structure arrangement may be adapted relative to the support structure arrangement, thereby simplifying the assembly of both. Preferably, however, the pin is inserted as far as a stop in the hollow space. In this case, the projections of a pin and the lugs of a socket element are preferably uniformly spaced apart from one another, the distances of the projections from one another corresponding to the distances of the lugs from one another.

BRIEF DESCRIPTION OF THE DRAWINGS

The subject matter disclosed herein is explained in greater detail below with reference to drawings depicting two preferred exemplary embodiments, in which.

DETAILED DESCRIPTION

Figure 1:
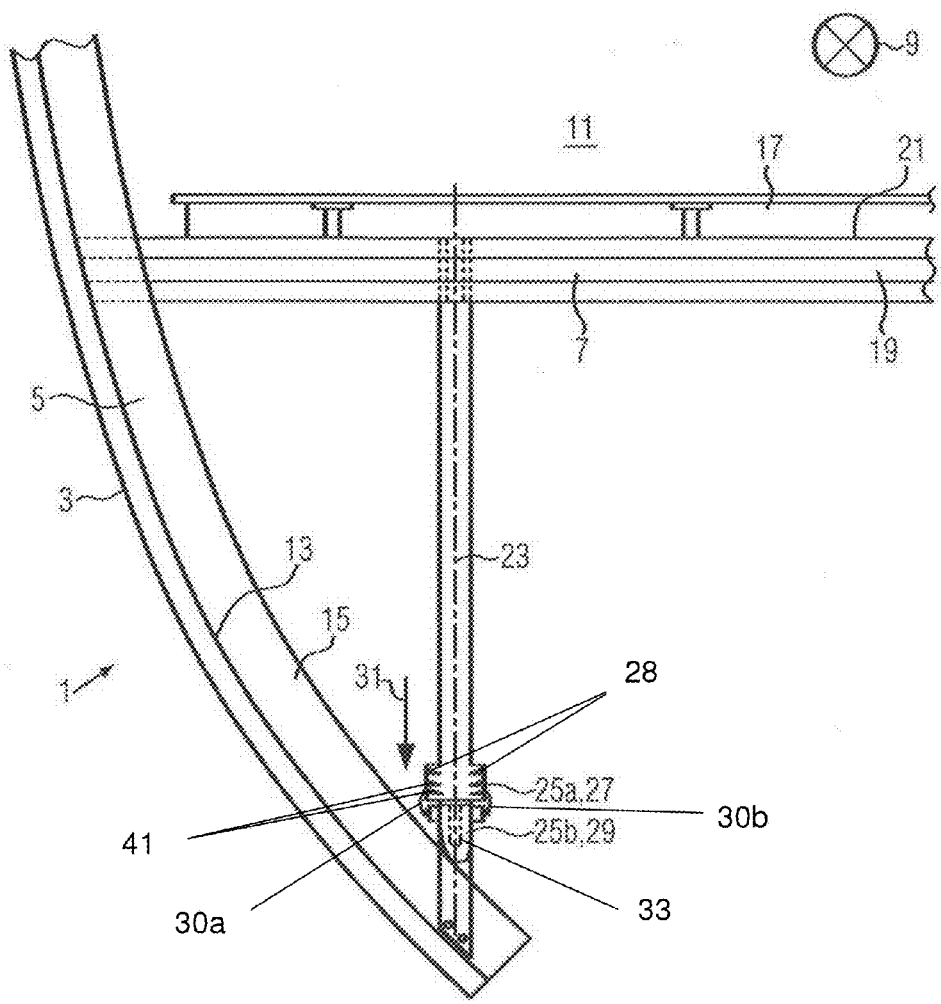
FIG. 1 shows a portion of a sectional view transverse to the aircraft longitudinal axis of one exemplary embodiment of an aircraft fuselage structure according to the subject matter disclosed herein.

FIG. 1 shows a first exemplary embodiment of an aircraft fuselage structure 1 according to the subject matter disclosed herein, comprising an outer skin 3, a support structure arrangement 5 and a floor structure arrangement 7.

The outer skin 3 extends in a substantially cylindrical shape along an aircraft longitudinal axis 9, in particular, in the center section of the aircraft fuselage structure 1, and encloses an interior space 11. The outer skin 3 includes an inner surface 13 directed toward the interior space 11, along which the support structure arrangement 5 extends.

The support structure 5 comprises a plurality of frame members 15, which extend perpendicularly to the aircraft longitudinal axis 9 in the circumferential direction of the outer skin 3 along the inner surface 13 of the outer skin 3, and which are spaced apart from one another in a direction parallel to the aircraft longitudinal axis 9. In addition, a plurality of stringer elements, not further shown, extend parallel to the longitudinal axis on the inner surface 13 of the outer skin The floor structure arrangement 7 comprises a floor plate 17, which extends in a plane parallel to the aircraft longitudinal axis 9, as well as a plurality of floor support carriers 19, which extend along a bottom surface 21 of the floor plate 17 and perpendicular to the aircraft longitudinal axis 9. To support the floor support carriers 19, a plurality of floor support struts 23 are provided, which extend, from the floor support carriers 19 on the bottom surface 21 of the floor plate 17 toward the frame elements 15, perpendicular to the floor support carriers 19.

The floor structure arrangement 7 is connected to the support structure arrangement 5 via connection parts 25a, 25b, the connection part 25a provided on the floor support struts 23 including a plug element 27 and a locking element 28 and the connection part 25b provided on the frame elements 15 including a socket element 29 and a first and a second clamping element 30a, 30b. In this arrangement, the plug element 27 engages with the socket element 29 in an engagement direction 31, and the clamping element 30 engages with the locking element.

Figure 2:
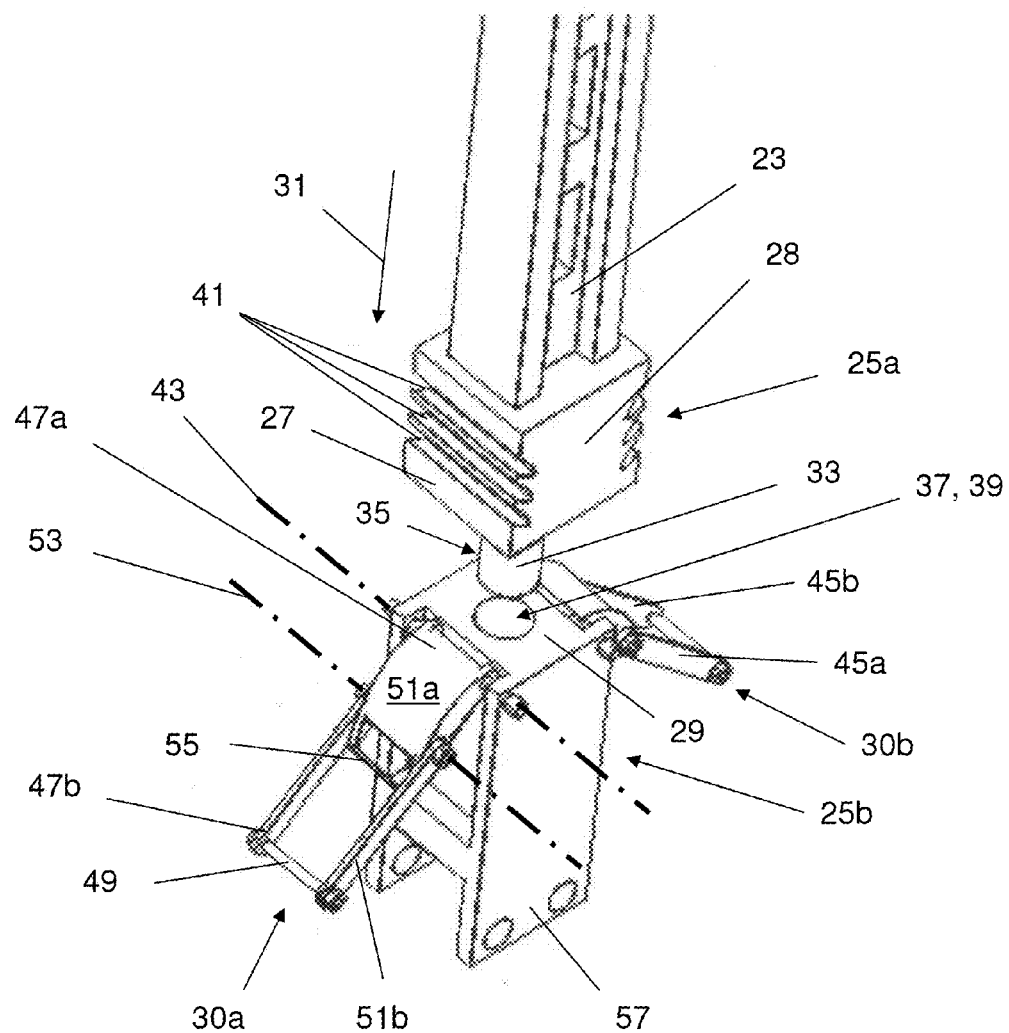
FIG. 2 shows a perspective view of a detail of a floor structure arrangement, having a locking element which includes locking grooves situated opposite one another, and a plug element, as well as a view of a connection part of a support structure arrangement having two clamping elements disposed opposite one another and a socket element of the aircraft fuselage structure from FIG. 1 prior to an engagement of the clamping element with the locking element and the plug element with the socket element.

As is apparent from FIG. 2, the plug element 27 in this first exemplary embodiment includes a pin 33 which extends in the direction of engagement 31 and includes a cylindrically shaped circumferential outer surface 35. In this arrangement, the plug element 27 is attached at the end of the floor support struts 23 spaced apart from the floor plate 17 in such a way that the pin 33 forms an extension of the floor support struts 23. The socket element 29 includes a hollow space 37 which is adapted to receive the pin 33, and which is surrounded by a cylindrical circumferential inner surface 39 of the socket element 29.

The locking element 28, as seen transversely to the direction of extension of the floor support strut 23, includes multiple locking grooves 41 on opposite sides, which extend on each side, parallel and uniformly spaced relative to one another, and perpendicular to the direction of extension of the floor support strut 23. The first and the second clamping elements 30a, 30b, as seen transversely to the direction of extension of the floor support strut 23, are movably fastened, i.e. pivotable about a first pivot axis 43, on opposite sides of the connection part 25b. In this arrangement, the first pivot axis runs perpendicular to the direction of extension of the floor support struts 23 and to the direction of engagement 31.

The first and the second clamping elements 30a, 30b in the present exemplary embodiment are identical in design, at least in their substantial features. Each of the clamping elements 30a, 30b comprises one first and, parallel to the first, one second longitudinal section 45a, 45b. Each longitudinal section 45a, 45b in turn includes a first end 47a and a second end 47b, the longitudinal sections 45a, 45b being pivotally connected at the first end 47a with the connection part 25b about the first pivot axis 43, and connected to one another at the second end 47b via a transverse section 49.

The transverse section 49 extends perpendicular to the longitudinal sections 45a, 45b and is designed in order to engage the locking grooves 41 when the clamping elements 30a, 30b are pivoted about the first pivot axis 43 into engagement with the locking element 28. In this arrangement, the clamping elements 30a, 30b may be pivoted from a released position, in which the transverse section 49 is disengaged from the locking grooves 41, into an engagement position, in which the transverse section 49 engages a locking groove 41.

Each longitudinal section 45a, 45b includes one first segment 51a and one second segment 51b, the first and second segments 51a, 51b being movably connected to one another, i.e. pivotable about a second pivot axis 53 parallel to the first pivot axis 43. The first segment 51a includes the first end 47a and the second segment 51b includes the second end 47b. Also provided on the first segment 51a is an actuation segment 55 which extends beyond the second pivot axis 53 as an extension of the first segment 51a, and which is configured to manually pivot the first segment 51a about the first pivot axis 43 relative to the connection part 25b and/or about the second pivot axis 53 relative to the second segment 51b.

As shown in FIG. 2, the socket element 29 may also be fastened to the frame elements 15 with the aid of a clamping device 57, which encloses the frame elements 15, for example, by a rivet connection.

The aircraft fuselage structure 1 may be assembled as follows. First, the socket element 29, with the clamping device 57 attached to the socket element 29, is fastened to the frame elements 15 of the support structure arrangement 5 in an arbitrary manner, for example, by pre-assembled rivet connections, the clamping device 57 enclosing the frame elements 15 from both sides, and the socket element 29 being aligned in such a way that the opening 63 of the hollow space 37 points in a direction in which the floor support struts 23 are intended to extend once assembly is complete, and which extend perpendicular to the floor support carriers 19 (see FIGS. 1 and 2).

The floor support struts 23 provided with the plug element 27 and the locking element 28 are then aligned relative to the socket element 29 and the clamping elements 30*a*, 30*b* in such a way that the pin 33 of the plug element 27, continuing as an extension of the floor support struts 23, is situated opposite the opening 63 of the hollow space 37 of the socket element 29, the pin 33 and the hollow space 37 being disposed along an axis. At this point, the pin 33 of the floor support struts 23 is lowered in the direction of engagement 31 into the hollow space 37, thereby preventing a lateral movement of the floor support struts 23 transversely to their direction of extension.

Subsequently, the first and second clamping element 30*a*, 30*b* are pivoted about the first pivot axis 43 until the transverse section 49 engages with the corresponding locking grooves 41 of the locking element 28. Thereafter, the actuation segment 55 is actuated, i.e., pushed toward the connection part 25*b*, in such a way that the first segment 51*a* is pivoted about the first pivot axis 43 relative to the connection part 25*b*, and about the second pivot axis 53 relative to the second segment 51*b* in such a way that the first segment 51*a* is situated next to the second segment over the greatest part of its extension, as a result of which the longitudinal sections 45*a*, 45*b* are shortened in terms of their overall length, and in this way pre-tensioned, and secure the transverse section 49 in the corresponding locking groove 41.

Once the floor support struts 23 have been fastened to the frame elements 15 in the manner described above, the ends of the floor support struts 23 opposite the plug element 27 are connected to the floor support carriers 19 in an arbitrary manner, for example, by pre-installed rivet connections, thereby creating a right angle between floor support struts 23 and floor support carriers 19 in a plane perpendicular to the aircraft longitudinal axis 9 (see FIG. 1). It is understood that the floor support struts 23 may also be mounted on the floor support carriers 19 before the plug connection according to the subject matter disclosed herein is established. Subsequently, but also in advance, the floor support carriers 19 may be fastened to the frame elements 15, for example, by conventional rivet connections.

With an aircraft fuselage structure 1 according to the first exemplary embodiment, which utilizes such a connection via a clamping element 30*a*, 30*b* and a locking element 28, as well as via a plug element 27 and a socket element 29, it is possible to connect the floor support struts 23 to the frame elements 15 in a very simple, rapid, and secure manner, eliminating the need for drill holes, which would result in the formation of shavings.

Figure 3:
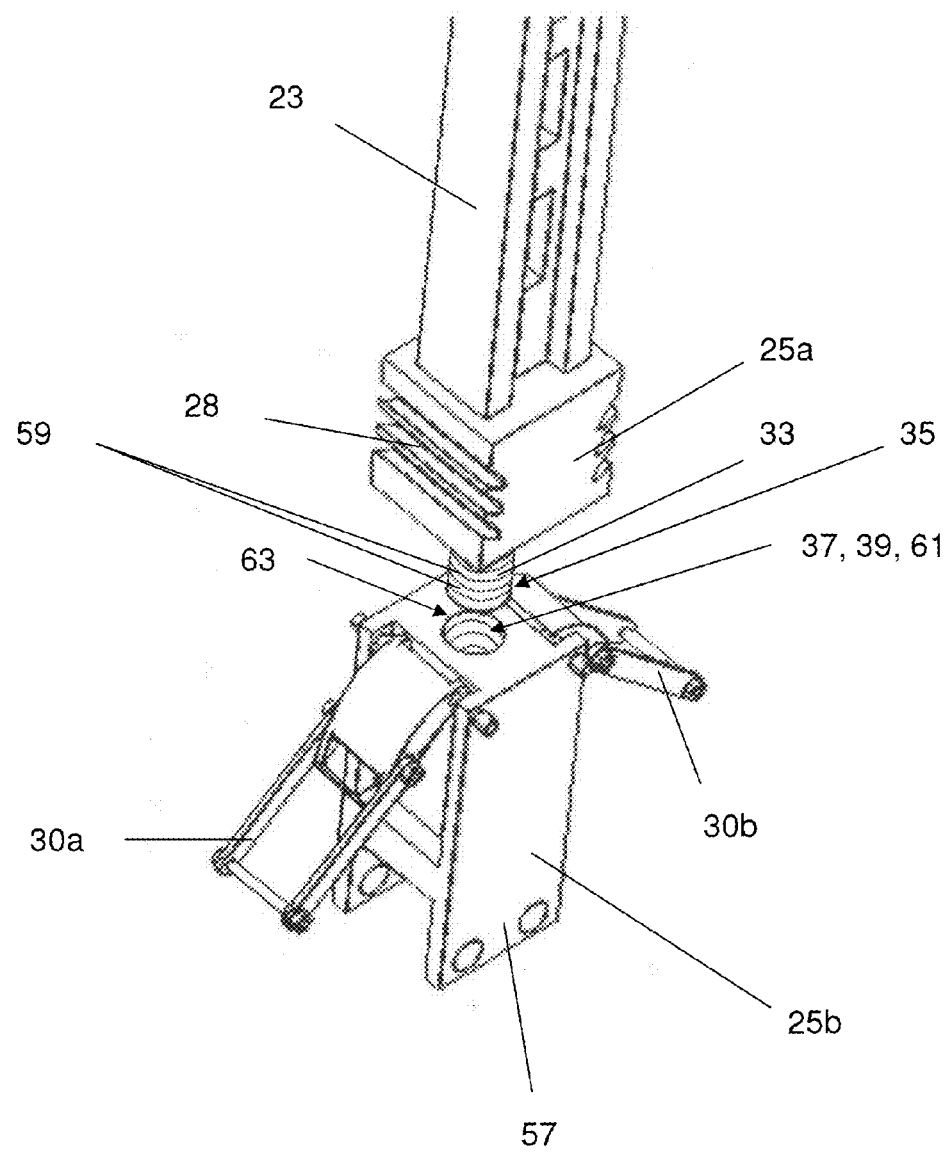
FIG. 3 shows a perspective view of a detail of a floor structure arrangement of a second exemplary embodiment of an aircraft fuselage structure, which differs from the exemplary embodiment shown in FIG. 2 in that the pin includes projections on its outer surface, and in that the socket element includes lugs on its inner surface.

FIG. 3 shows a section of a second exemplary embodiment of the aircraft fuselage structure 1 according to the subject matter disclosed herein in which, due to the close similarity to the first exemplary embodiment, similar features are indicated by identical reference numerals.

The second exemplary embodiment is based on the first exemplary embodiment, in which, however, the outer surface 35 of the pin 33 is provided with a plurality of circumferential projections 59, which extend perpendicular to the direction of engagement 31, and which are spaced apart from one another. However, the projections 59 may also be designed in a direction inclined away from the direction of engagement 31. The projections 59, together with the remaining outer surface 35 of the pin 33 are formed from a hard plastic material.

Further according to the second exemplary embodiment, the inner surface 39 of the socket element 29 is provided with a plurality of circumferential lugs 61, which extend from the inner surface 39 toward the center of the hollow space 37 and are adapted to be received between the projections 59 of the pin 33. The lugs 61 may be inclined in the direction of engagement 31. In addition, the inner surface 39 of the socket element 29 including the lugs 61 is formed from a hard plastic material.

The assembly of the second exemplary embodiment differs from that of the first exemplary embodiment in that, once the floor support struts 23, provided with the plug element 27 and the locking element 28, have been aligned opposite the socket element 29 and the clamping elements 30*a*, 30*b*, the floor support struts 23 are moved by a force in the direction of engagement 31 toward the socket element 29, wherein the pin 33 is inserted into the hollow space 37. The force which presses the pin 33 into the hollow space 37 results in, or must be adapted in such a way that, the projections 59 push aside the lugs 61 in the direction of engagement 31 to the extent that the projections 51 are able to move past the lugs 61. Thus, the projections 59 are received in the space between the individual lugs 61. Because the lugs 61 are inclined in the direction of engagement 31 and the projections 59 are inclined counter to the direction of engagement 31, and the angles of inclination of the lugs 61 and projections 59 are essentially identical, the lugs 61 lock the projections 59 in a direction counter to the direction of engagement 31 and ensure that the pin 33 can no longer be moved out of the hollow space 37.

The pin 33 may be inserted into the hollow space 37, i.e., as many projections 59 may be moved past as many lugs 61 as is required for assembly. Thus, the axial position of the floor support struts 23 may also be adapted during assembly to the plug connection according to the subject matter disclosed herein, consisting of plug element 27 and socket element 29. In this case, the general rule is that the farther into the hollow space 37 the pin 33 is inserted, the more durable the connection is. Generally, however, the pin 33 is inserted as far as a stop 37 in the hollow space 37.

If, after manufacture, it is necessary to disengage the plug connection between the plug element 27 and the socket element 29, this may be accomplished, for example, by drilling out the hollow space 37.

A connection of this type, according to the second exemplary embodiment, having projections 59 which engage the lugs 61, in addition to the socket element 30*a*, 30*b*, which engages with the locking element 28, makes it is possible to achieve an additional fastening of the two connection parts 25*a*, 25*b* to one another, as a result of which the connection is further reinforced and stabilized.

Figure 4:
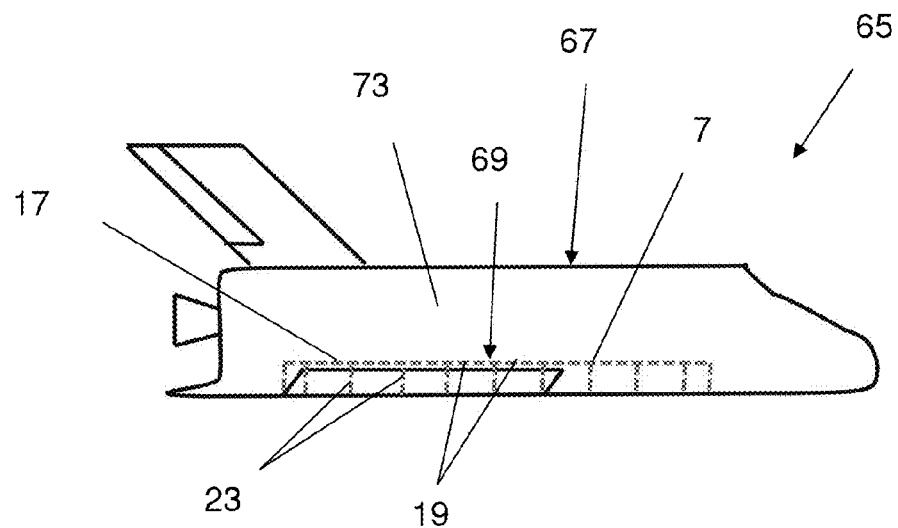
FIG. 4 is a lateral cross-sectional view of a schematic representation of a space shuttle having a continuous floor structure arrangement, and in FIG. 5 a lateral cross-sectional view of a schematic representation of a space shuttle having floor structure arrangement removed in the front section for accommodating a large cargo unit.
Figure 5:
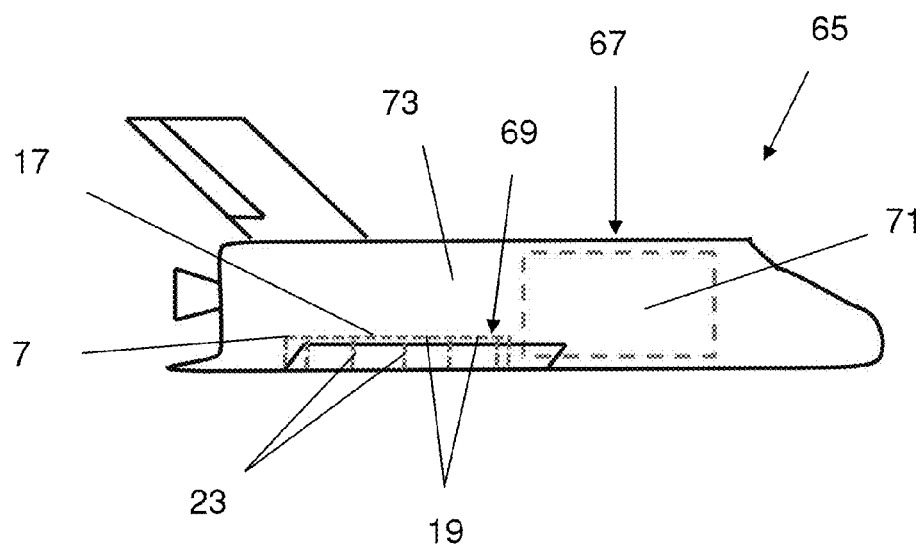

An aircraft fuselage-type system in the form of a space shuttle 65 is shown in FIGS. 4 and 5, in which the connection of the subject matter disclosed herein may also be used. FIG. 4 shows a floor structure arrangement 7 having a floor plate 17, a plurality of floor support carriers 19, and a plurality of floor support struts 23, which extend along the entire length of the fuselage 67 of the space shuttle 65, thereby providing a planar floor surface 69 over this entire length, for example, for the crew cabin. In FIG. 5, on the other hand, a portion of the floor structure arrangement 7 in the front part of the fuselage 67 of the space shuttle 65 has been removed, so that more space is available in this part of the fuselage for various large cargo units 71 such as, for example, satellites or space station components. Thus, a connection similar to the subject matter disclosed herein, using a clamping element 30*a*, 30*b* and a locking element 28, makes it possible to easily and quickly remove or restore a floor structure arrangement 7, or a portion thereof, in the space shuttle 65 (see FIG. 4 in relation to FIG. 5, or vice versa), in order, in this way, to adapt the interior space 73 of the space shuttle 65 to differing space requirements/range of tasks.

The invention claimed is:

1. An aircraft fuselage structure comprising:
an outer skin which encloses an interior space, includes an inner surface facing the interior space, and extends along an aircraft longitudinal axis;
a support structure arrangement comprising a plurality of frame elements which extend in a circumferential direction along the inner surface of the outer skin and are spaced apart from one another in a direction parallel to the aircraft longitudinal axis;
a floor structure arrangement comprising a floor plate which extends in a plane parallel to the aircraft longitudinal axis, a plurality of floor support carriers which extend along a bottom surface of the floor plate and perpendicular to the aircraft longitudinal axis, and a plurality of floor support struts which extend from the plurality of floor support carriers on the bottom surface of the floor plate to the plurality of frame elements;
wherein the floor structure arrangement is connected to the support structure arrangement via connection parts;
wherein the connection parts of the floor structure arrangement or the support structure arrangement include one or more clamping elements and the connection parts of the floor structure arrangement or the support structure arrangement which do not include clamping elements include one or more locking elements;
wherein the one or more clamping elements are configured to engage with the one or more locking elements;
wherein each clamping element includes a longitudinal section having a first end and a second end, the first end being attached to a corresponding connection part for pivotable movement about a first pivot axis and the second end including a transverse section which extends away from the longitudinal section;
wherein each locking element includes at least one locking groove configured to engage with the transverse section; and
wherein the one or more clamping elements are pivotable between an engagement position, in which the transverse section is engaged with the locking groove, and a released position, in which the transverse section is disengaged from the locking groove.

2. The aircraft fuselage structure according to claim 1, wherein the longitudinal section includes a first segment and a second segment,
the first segment including the first end and the second segment including the second end,
the first and the second segment being pivotally connected about a second pivot axis, and
the second pivot axis being oriented parallel to the first pivot axis.

3. The aircraft fuselage structure according to claim 2, wherein an actuation segment on the first segment manually moves the first segment and wherein the actuation segment is rigidly connected to the first segment and extends away therefrom.

4. The aircraft fuselage structure according to claim 1, wherein the plurality of frame elements or the plurality of floor support struts include one or more clamping elements and the plurality of frame elements or the plurality of floor support struts which do not include the clamping element include one or more locking elements.

5. The aircraft fuselage structure according to claim 4, wherein the plurality of frame elements include one or more clamping elements and the plurality of floor support struts include one or more locking elements.

6. The aircraft fuselage structure according to claim 4, wherein the first pivot axis extends perpendicular to a direction of extension of the plurality of floor support struts.

7. The aircraft fuselage structure according to claim 4, wherein the at least one locking groove extends perpendicular to a direction of extension of the plurality of floor support struts.

8. The aircraft fuselage structure according to claim 4, wherein a first and a second clamping element are attached, substantially perpendicularly to a direction of extension of the plurality of floor support struts, on opposite sides of the connection parts, wherein the locking element includes locking grooves on opposite sides, and wherein the locking grooves are substantially perpendicular to the direction of extension of the plurality of floor support struts.

9. The aircraft fuselage structure according to claim 1, wherein the one or more clamping elements include a first longitudinal section and a second longitudinal section, and wherein the transverse section connects the two longitudinal sections.

10. The aircraft fuselage structure according to claim 9, wherein the second longitudinal section is oriented parallel to the first longitudinal section.

11. The aircraft fuselage structure according to claim 1, wherein the connection parts of the floor structure arrangement or the support structure arrangement include one or more plug elements and the connection parts of the floor structure arrangement or the support structure arrangement which do not include plug elements include one or more socket elements,
wherein the one or more plug elements include a pin which extends in a direction of engagement, and
wherein the one or more socket elements include a hollow space adapted to receive the pin.

12. The aircraft fuselage structure according to claim 11, wherein the plurality of frame elements or the plurality of floor support struts include one or more plug elements and the plurality of frame elements or the plurality of floor support struts that do not include plug elements include one or more socket elements.

13. The aircraft fuselage structure according to claim 12, wherein the plurality of frame elements include one or more socket elements and the plurality of floor support struts include one or more plug elements.

14. The aircraft fuselage structure according to claim 13, wherein the clamping elements and/or the one or more socket elements are fastened to the plurality of frame elements by a clamping device which encloses the plurality of frame elements.

15. The aircraft fuselage structure according to claim 13, wherein the one or more plug elements are attached at an end of the plurality of floor support struts remote from the floor plate in such a way that the pin is disposed as an extension of the plurality of floor support struts.

16. The aircraft fuselage structure according to claim 11, wherein the pin has a circumferential outer surface, wherein a plurality of circumferential projections are disposed on the outer surface, wherein the plurality of circumferential projections extend away from the outer surface at an angle relative to the direction of engagement and are spaced apart from one another, and wherein the hollow space is surrounded by a circumferential inner surface of the socket element, the inner surface comprising a plurality of circumferential lugs which extend from the inner surface toward a center of the hollow space and adapted to be received between the plurality of circumferential projections of the pin.

* * * * *